United States Patent [19]  
Deane et al.

[11] 4,306,727  
[45] Dec. 22, 1981

[54] DYNAMIC SEAL FOR ROLLING CUTTER DRILL BIT

[75] Inventors: John D. Deane, Houston; Robert J. Kotch, Humble, both of Tex.

[73] Assignee: Reed Rock Bit Company, Houston, Tex.

[21] Appl. No.: 171,684

[22] Filed: Jul. 24, 1980

[51] Int. Cl.³ .................... F16J 15/38; E21B 9/10; E21B 9/35
[52] U.S. Cl. ......................... 277/12; 277/81 R; 277/84; 277/92; 175/359; 175/371; 308/8.2
[58] Field of Search .................. 277/81 R, 85, 92, 95, 277/84, 94, 12; 175/359, 371; 308/8.2

[56] References Cited

U.S. PATENT DOCUMENTS

| 3,765,495 | 10/1973 | Murdoch et al. | 175/371 |
| 4,037,673 | 7/1977 | Justman | 175/371 |
| 4,183,542 | 1/1980 | Quartara | 277/92 |

FOREIGN PATENT DOCUMENTS

| 942289 | 2/1974 | Canada | 277/92 |
| 641560 | 8/1950 | United Kingdom | 277/92 |

Primary Examiner—Robert S. Ward, Jr.  
Attorney, Agent, or Firm—Michael J. Caddell

[57] ABSTRACT

A dynamic seal is disclosed for sealing between a rotating cutter and a drill bit journal in an underground formation drilling bit, which seal utilizes a static elastomeric seal ring abutting a metal seal ring having a dynamic sealing face.

10 Claims, 9 Drawing Figures

DYNAMIC SEAL FOR ROLLING CUTTER DRILL BIT

BACKGROUND OF THE INVENTION

Normally, rolling cutter drill bits such as oil well bits, blast hole bits and mining bits, may be classified as either "sealed" or "unsealed" bits. The sealed bits, which are usually the premium line of bits, utilize elastomeric seals between the rotating cutters and the bearing journals to prevent intrusion of dirt, sand, rock cuttings, corrosive liquids and other contaminants into the bearing area. This reduction of detritus into the bearing area prolongs the life of the bearings and extends the drilling life of the bit. One such premium sealed bit having particularly good elastomeric journal bearing seals is that disclosed in U.S. Pat. No. 4,037,673, granted to Daniel B. Justman on July 26, 1977, which patent is herein incorporated by reference.

In the Justman patent, the drawing reveals a frustoconical rolling cutter 15 which is rotatably mounted on a bearing shaft 14 by bearings 18 and 19a. An elastomeric sealing ring 25 is located in an internal groove 24 in cutter 15 and sealingly engages shaft 14. The sealing ring can be an O-ring or be rectangular in cross-section, and is placed in hoop compression. The seal preferably is static with respect to the cutter and dynamic with respect to the shaft.

Although the Justman drilling bit sealing system is an improvement over the seals that were conventional at that time, such as that disclosed in U.S. Pat. No. 3,765,495, it does suffer from one disadvantage also affecting the other known bit sealing systems. Conventional bit seals utilize a dynamic interface between the elastomeric seal member and either the bearing journal, the cutter, or both. As a result of the continuous movement of the elastomeric seal against one or both of the metal elements, a rapid wear and deterioration of the seal surface usually occurs. Efforts to slow this wear and deterioration have included the shielding type of structure disclosed in the aformentioned Justman patent and a polishing of the metal faces which contact the seal to a high surface smoothness.

The present invention eliminates the elastomeric seal deterioration from sliding contact with metal surfaces by replacing the usual single elastomeric seal with a compound elastomeric and metal sealing system, with the metal component providing the dynamic seal against the rotating metal component in the bit.

DESCRIPTION OF THE PREFERRED EMBODIMENTS

Figure 1:
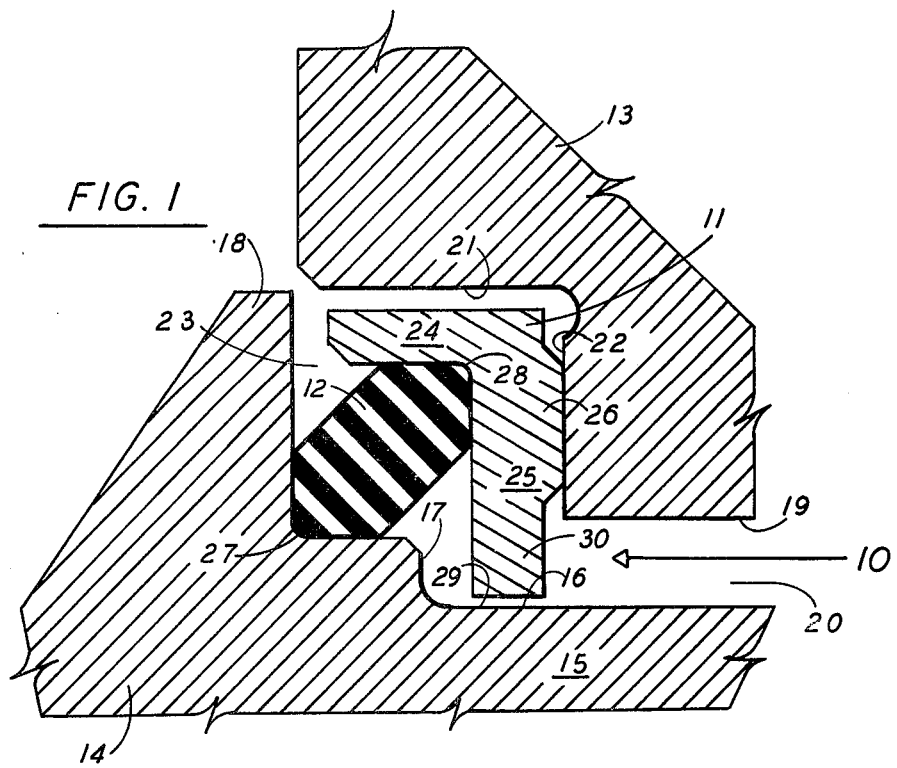
FIG. 1 is a tangential cross-sectional view of a portion of drill bit containing one embodiment of the invention.

Referring to the drawings, and more specifically, to FIG. 1, a sealing assembly 10 manufactured according to the present invention is disclosed in cross-sectional configuration. The assembly comprises a rigid metal ring 11 which is formed to have an L-shaped cross-section, and which abuts a circular elastomeric seal 12. Seal assembly 10 is particularly adapted for sealing the annular space between a rolling cutter 13 and a drill bit journal 14. Cutter 13 and journal 14 are illustrated in cross-sectional view with only the relevant portions being disclosed herein. It should be noted that the cutter 13 and bearing journal 14 may be of the typical cutter and journal construction utilized in conventional bits. In the present invention, journal 14 utilizes a bearing shaft 15 having a bearing surface 16 formed thereon. Adjacent the bearing surface 16 is a land or raised shoulder 17 formed at the base of shaft 15. A flange 18 adjoins land 17 and forms the outer barrier of the seal pocket.

Cutter 13 has an inner bore 19 arranged for concentric location over shaft 16 with a gap or annular space 20 therebetween. Cutter 13 has an enlarged annular bore 21 at the back face thereof to provide space for seal assembly 10. The perpendicular face 22 located annularly between bores 21 and 19 forms the remainder of the seal pocket 23. Annular face 22 is a part of the dynamic sealing system associated with seal assembly 10. The metal ring 11, which has a cross-sectional L-shape, has an upper retainer leg 24 and a lower retainer leg 25. A raised seal shoulder 26 is formed on lower leg 25. The circular seal member 12 is located between flange 18 and shoulder 17 and is in abutment with the legs 24 and 25 opposite surface 26.

Figure 3:
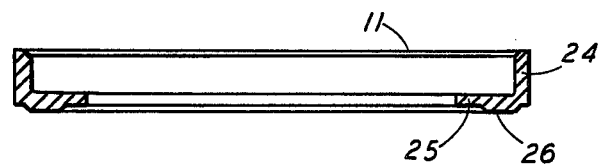
FIG. 3 is a cross-sectional radial view of a typical metal component of the present invention.
Figure 4:
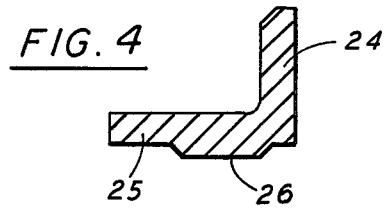
FIG. 4 is a close-up view of a portion of FIG. 3.
Figure 7:
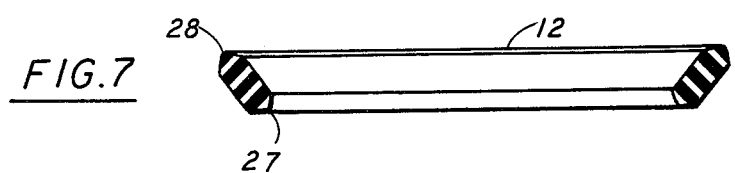
FIG. 7 is a cross-sectional radial view of the elastomeric ring of FIG. 6.
Figure 8:
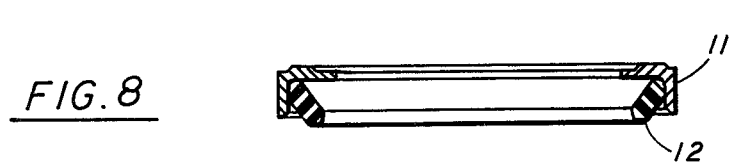
FIGS. 8 and 9 are cross-sectional and partial cross-sectional views, respectively, of the seal system of this invention.
Figure 9:
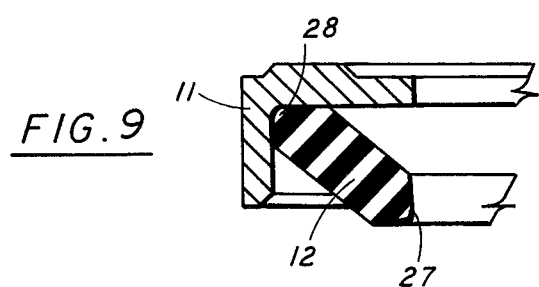

FIGS. 3 and 7 are cross-sectional side views of the metal ring 11 and the elastomeric seal 12. The seal 12 is essentially a circular elastomeric seal having an elongated cross-sectional area formed in basically a funnel, or conical, shape. The radially innermost portion 27 is located against bearing journal 14 while the radially outermost section 28 abuts seal ring 11. The seal ring 12 has the upper shoulders 28 and 27 bevelled as shown in FIG. 7 in order to more efficiently seal against the right angular surfaces 18 and 17, and the right angular legs 24 and 25. The engagement of the elastomeric ring 12 and the metal ring 11 is shown in cross-section in FIG. 8 and in expanded partial cross-section of FIG. 9.

Figure 2:
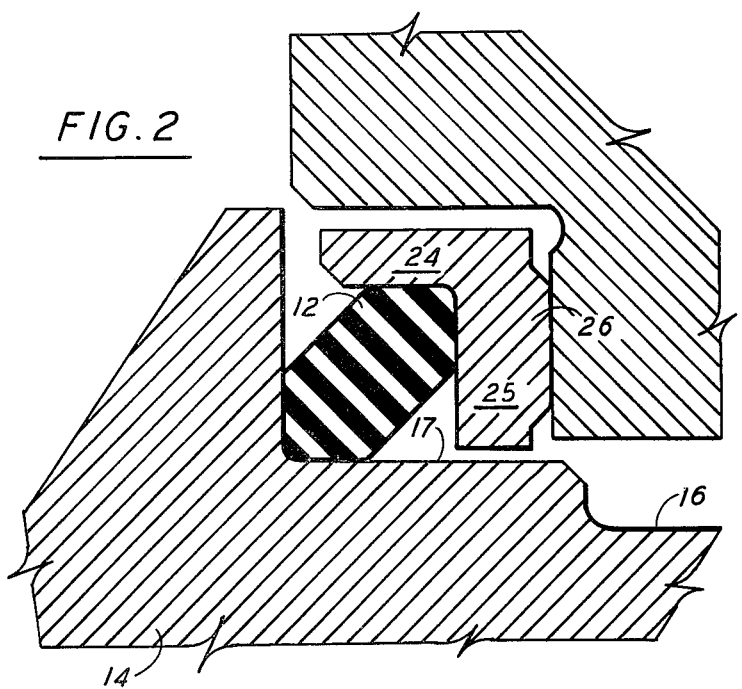
FIG. 2 is a tangential cross-sectional view of a portion of drill bit illustrating the embodiment of FIG. 1 rotated 90 degrees.
Figure 5:
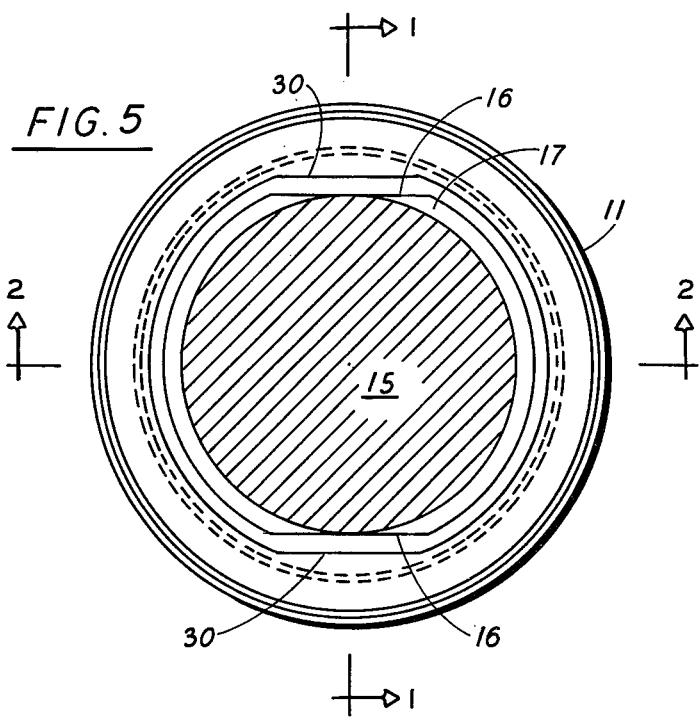
FIG. 5 is an axial view of the metal ring of FIGS. 3 and 4.
Figure 6:
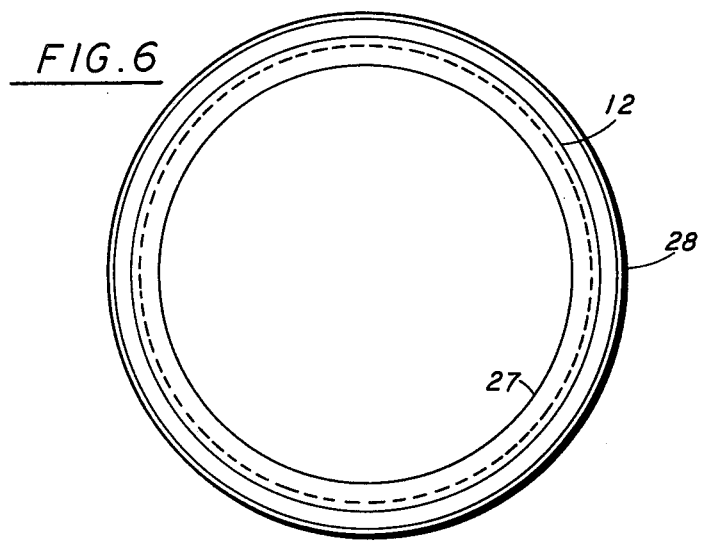
FIG. 6 is an axial view of the elastomeric ring of the invention.

Referring now to FIG. 5, the L-shaped metal ring 11 is illustrated in an axial end view showing the means for preventing rotation of the metal ring on the bearing shaft 16. In FIG. 5 the L-shaped sealing ring 11 is shown having a pair of inner opposed tab sections 30 formed in the inner periphery of ring 11 and projecting radially inward. Likewise, a pair of opposed flats 29 are machined on shoulder 17 in bearing journal 14. Flats 29 and tabs 30 are formed in complementary relationship to provide a locking arrangement of ring 11 on shoulder 17. Whereas FIG. 5 is an axial end view of locking ring 11 on journal 14, FIG. 2 is a cross-sectional side view of the sealing assembly located on journal 14. FIG. 2 is a view similar to that of FIG. 1, but taken at a point rotated approximately 90 degrees from that of FIG. 1. The orientation of FIGS. 1 and 2 is illustrated in FIG. 5 by section lines 1—1 and 2—2. Section line 1—1 represents the cross-sectional view of FIG. 1, and Section line 2—2 represents the cross-sectional view of FIG. 2.

In typical operation, the seal assembly of this invention is installed in a drilling bit by placing the elastomeric seal ring 12 over the bearing journal shaft 17 and onto snug fitting engagement on shoulder 17. Then the metal L-shaped dynamic seal ring 11 is slipped over bearing shaft 16 to abut elastomeric ring 12. After seal ring 12 and metal ring 11 are properly located on shaft 16 and shoulder 17, the cutter 13 is assembled on the journal. The smooth machined sealing surface 22 of cutter 13 is brought into engagement with complementary sealing surface 26 on arm 25 of ring 11. The abutment of ring 11 with seal 12 and between seal 12 and flange 18 provides the static seal between the cutter and the bearing journal. The abutment of surface 26 with surface 22 provides the dynamic seal therebetween. As shown in FIG. 5, metal ring 11 is prevented from rotating on bearing journal 17 by the provision of opposed inner tabs 30 which mate with flats 29 formed on shoulder 17. The remainder of shoulder 17, in conjunction with tabs 30, locks ring 11 onto journal 14 and prevents rotation of ring 11 while cutter 13 is rotating on the journal. Also, it should be noted that ring 11 and seal 12 are sized such that when cutter 13 is rotatably attached to bearing journal 14, seal member 12 is placed in compression sufficient to maintain ring 11 urged snugly against surface 22. The elastomeric nature of seal 12 along with its geometric configuration serves to act as a Belleville spring against ring 11 to keep it in tight contact with the sealing surface 22 in cutter 13. Likewise, the bevelled ends 27 and 28 of seal 12 maintain proper alignment of the ring between flange 18, shoulder 17 and the L-shaped portion of ring 11. This alignment also helps maintain ring 11 in proper alignment against surface 22.

The materials from which the elastomeric seal and the metal ring are formed may be any of the conventional elastomers utilized in seals today for the seal ring; and any good alloy steel or chrome steel or copper beryllium material may be used in the metal ring. For example, one particularly good elastomer for use in the seal ring would be a silicone rubber having good temperature properties and poor dynamic deterioration resistance. Because of the static nature of the seal, there is no requirement for a high dynamic deterioration resistance, and the silicone rubber would make a very desirable seal. Because of the nature of the sealing system disclosed herein, i.e., the static nature of the elastomeric seal, properties of the elastomeric seal ring 12 can be selected without regards to any need for resistance to dynamic wear. Such properties which may be selectively enhanced might be high temperature resistance and/or high resistance to corrosive fluids.

Although certain preferred embodiments of the invention have been herein described in order to provide an understanding of the general principles of the invention, it will be appreciated that various changes and innovations can be effected in the described rolling cutter drill bit seal system without departing from these principles. For example, whereas the elastomeric seal disclosed is shaped in a frusto-conical ring, it is clear that other geometric configurations of the elastomeric seal could be utilized. The invention, therefore, is declared to cover all changes and modifications of the specific example of the invention herein disclosed for purposes of illustration which do not constitute departures from the spirit and scope of the invention.

Embodiments of the invention in which an exclusive property or privilege is claimed are defined as follows:

1. In a rolling cutter drill bit of the type having a plurality of downwardly extending legs, each leg having a cylindrical journal extending therefrom, with a cutter body rotatably mounted on each said journal by bearing means, and a seal between said cutter and said journal outwardly of said bearing means, the improvement comprising:
   said seal comprising a compound seal assembly having a rigid circular ring with a generally L-shaped cross-sectional configuration and having a relatively smooth, flat sealing surface formed externally thereon; and a generally frusto-conical resilient ring adapted for snugfitting relationship on said journal and against said rigid ring;
   shoulder means on said rigid ring and said journal arranged to prevent rotation of said rigid ring on said resilient ring; and,
   said cutter having a smooth flat counterbore surface therein arranged to rotatingly and sealingly engage said smooth flat surface on said rigid ring.

2. The drill bit of claim 1 wherein said rigid ring is formed of metal and said resilient ring is formed of an elastomer.

3. The drill bit of claim 1 or claim 2 wherein said resilient ring is selected from a material which exhibits good static sealing qualities and good resistance to high temperature deterioration.

4. The drill bit of claim 1 or claim 2 wherein said resilient ring is selected from a material which exhibits good static sealing qualities and good resistance to corrosive fluids.

5. The rolling cutter drill bit of claim 1 or claim 2 wherein said metal ring is formed from a hard metal selected from the group of cast metal, cast iron, steel, steel alloy, aluminum alloy, and copper-beryllium alloy.

6. The rolling cutter drill bit of claim 1 or claim 2 wherein said metal ring is formed from a hard metal selected from the group of cast metal, cast iron, steel, steel alloy, aluminum alloy, and copper-beryllium alloy, and said elastomer ring comprises silicon rubber.

7. A compound static-dynamic circular seal assembly for sealing the bearing structure of a rolling cutter drill bit against intrusion of foreign detritus from outside the drill bit, said seal assembly adapted for placement between the cutter and bearing journal of a rolling cutter drill bit, and said assembly comprising:
   a hard, rigid dynamic seal ring having a generally L-shaped cross-sectional configuration, a smooth flat external sealing surface, and means thereon for locking engagement on a bearing journal; and,
   a resilient static seal ring adapted for static peripheral sealing abutment between a bearing shaft and said rigid ring, and further adapted to provide resilient biasing of said rigid ring axially on a bearing shaft against a cutter.

8. The seal assembly of claim 7 wherein said resilient seal ring has a short frusto-conical configuration and is formed of an elastomer exhibiting good static sealing ability and good high temperature deterioration resistance.

9. The seal assembly of claim 7 or claim 8 wherein said rigid ring is formed of a hard metal selected from the group of steel, steel alloy, and copper-beryllium alloy.

10. The seal assembly of claim 7 or claim 8 wherein said rigid ring is formed of a hard metal selected from the group of steel, steel alloy, and copper-beryllium alloy, and said elastomer is a silicon rubber.

* * * * *